United States Patent Office 3,559,326
Patented Feb. 2, 1971

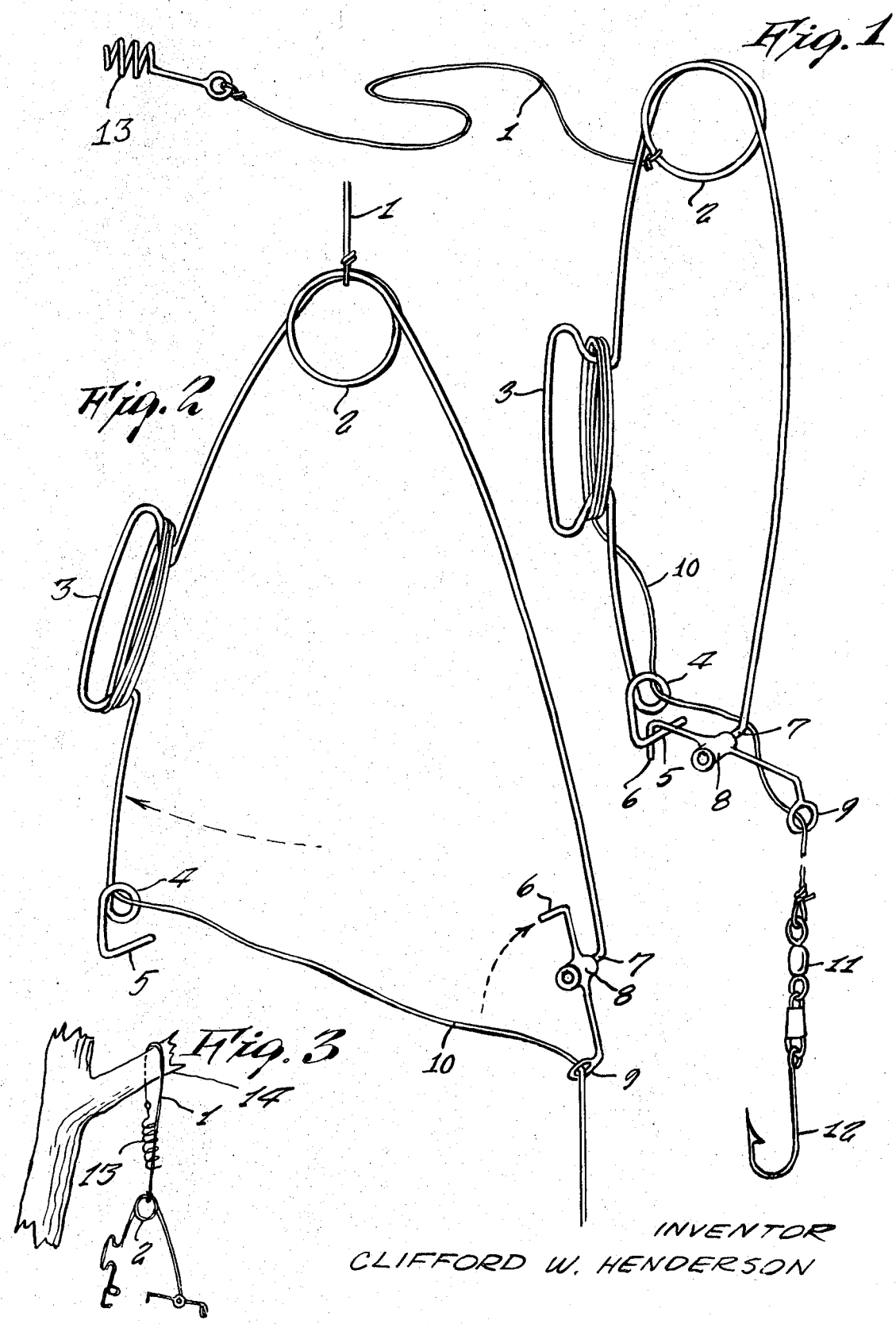

3,559,326
HOOK SETTER
Clifford W. Henderson, 3804 Greenway Place,
Shreveport, La. 71105
Filed Jan. 13, 1969, Ser. No. 790,625
Int. Cl. A01k 97/00, 97/12
U.S. Cl. 43—15     3 Claims

ABSTRACT OF THE DISCLOSURE

A device comprising a length of wire forming two elongated legs joined by a spring loop to provide spring tension to the legs. The end of one leg has a first loop and a transverse finger thereon and the other leg has a latch arm pivoted at its center to the end thereof. The latch arm has a second loop on one end and a downwardly-extending finger on the other end. The first leg has means thereon for storing fishing line and a portion of the line extends through both loops on the legs and is provided with a hook at its free end. When the legs are brought together, the fingers are engaged to set the device, and when a fish bites, the fingers are disengaged and the legs spring apart to set the hook in the fish's mouth.

SUMMARY OF THE INVENTION

I provide a length of tempered wire formed into a loop having two elongated legs, each leg being provided with an eye. On one leg, the eye is stationary and is provided with a first finger. On the other leg, the eye is formed on one end of a member pivotable at its center to the other leg. The other end of the pivotable member has another finger which can engage the first finger, drawing the two legs of the loop together. A fishing line extends through both eyes and terminates in a fishing hook.

When my device is disposed in water and a fish takes bait from the fishing hook, the fingers of the pivotable member and first loop end are disengaged, the legs of the loop spring apart and the fishing hook is set into the mouth of the fish.

BRIEF DESCRIPTION OF THE DRAWINGS

In the drawings:
FIG. 1 is a view of my invention in set position, and
FIG. 2 is a view of my invention in sprung position.
FIG. 3 is a view showing the invention in combination with a screw catch.

DETAILED DESCRIPTION OF PREFERRED EMBODIMENT

Referring now to FIGS. 1 and 2, my hook setter consists of a length of tempered wire which may be brass, stainless steel, nickel plated or galvanized, or any other suitable material, or the combination thereof, nylon string, swivel, and hook.

The hook setter is shown as a length of wire forming two elongated legs joined by a spring loop 2 to give the device its spring tension. A nylon string 1 is attached at one end to the spring loop 2 and at its other end to a screw catch 13 which is used in a manner described hereinafter. A first leg of the hook setter has an integral offset portion 3 formed by spacing a portion of the wire outwardly from the leg by a pair of S-shaped bends. Portion 3 is used for storing excess line which can be payed out so as to place a hook thereon at a desired depth. A loop 4 is formed adjacent to the end of the first leg which terminates in a transverse finger 5. A latch is pivoted at its center by means of a sleeve 8 on a transverse finger 7 on the end of the second leg of the hook setter. One end of the pivoted latch has a downwardly-extending finger 6 thereon and the other end of the latch is provided with a loop 9. A nylon string 10 is wound on portion 3 and has a length thereof passed through loops 4 and 9 and is provided at its free end with a swivel 11 and a hook 12.

In use, by pressing on either side of the spring wire, latch finger 6 can be engaged over finger 5 to hold the device in set position. Once hook 12 is baited and a fish attempts to remove same, the string 10 will apply pressure at point 9, pivoting the latch and releasing finger 6 from finger 5, permitting spring 2 to force the two sides apart, thereby giving sudden upward thrust to hook 12, thus setting the hook in the mouth of the fish. As the fish attempts to free himself, spring 2 will play the fish between loops 4 and 9. The more pressure applied, the closer loops 4 and 9 will be, and as pressure is slackened the hook setter will return to its sprung position.

The hook setter has been used many times and has proved most successful. I find its advantages to be as follows:

(1) It permits one to fish without actually being there. It is very simple to set and is easy to tell when the hook setter has been sprung.

(2) Fish that are caught on the hook setter will remain in the water and not be pulled high and dry.

The hook setter may be tied to limbs of trees or from docks and on trot lines, is excellent for jug fishing, and may be used above or under water. Jug fishing is a technique similar to trot line fishing in which a line having a hook is supported from a float which may be a bottle or jug floating at the surface of the water. The jug may be anchored or tied to some object to prevent its drifting, or it may be left adrift and located by the fisherman at some later time, such as in running a trot line. Thus, in jug fishing a readily locatable floating support for a fishing line is provided.

It will catch any kind of fish—crappie, bass, brim and catfish are just a few.

There is practically no way to wear it out as it has no springs or bearings to give trouble.

It won't rust or deteriorate due to being under water, and it works in salt water as well as fresh water and it works every time.

When the hook setter is ready for storing, the legs are moved toward each other against the tension of spring 2 and finger 5 is hooked behind finger 7. When in this position it will not spring open and tangle the line. To ready the hook setter for operation, just reverse the procedure described above.

As shown in FIG. 3, the present invention includes a screw catch 13 secured to the opposite end of the string 1; the screw catch comprises a spiral spring configurated element into which an intermediate portion of the string 1 can be wound for securement after the string has been passed around a bough 14.

While I have described my invention with particular reference to preferred embodiments, my protection is to be limited only by the terms of the claims which follow.

Having thus set forth and disclosed the nature of this invention, what is claimed is:

1. A hook setter comprising:
    a length of tempered wire having two elongated legs joined by a spring loop;
    a latch pin secured to the end of a first leg;
    an eye formed adjacent the said end of the first leg;
    a member pivotally secured substantially at its center to the end of a second leg and having an eye formed therein;
    a latch formed on said member at the other end thereof detachably engageable with said latch pin on said first leg, said hook setter being set when said latch and said latch pin are engaged and being sprung when said pin and said latch are disengaged; and means on said first leg for securing a length of line and permitting said length to be payed off therefrom, said length of line passing through both of said eyes.

2. A hook setter in accordance with claim 1 wherein said line has a free end with a fishing hook secured thereto.

3. A hook setter in accordance with claim 2 wherein said loop is secured to one end of a string, the opposite end of said string being secured to a screw catch, said screw catch comprising a coiled spring configurated member adaptable to engage an intermediate portion of said string after said string is looped over supporting means.

References Cited

UNITED STATES PATENTS

| 684,211 | 10/1901 | Ferch | 43—36 |
| 1,918,507 | 7/1933 | Westling | 43—43.11 |
| 2,504,822 | 4/1950 | Fritscher | 43—15 |

SAMUEL KOREN, Primary Examiner

D. J. LEACH, Assistant Examiner

U.S. Cl. X.R.

43—36, 43.11